United States Patent [19]

Nenstiel

[11] Patent Number: 4,936,420
[45] Date of Patent: Jun. 26, 1990

[54] TAXIGUARD

[76] Inventor: Frank S. Nenstiel, P.O. Box 91222, Long Beach, Calif. 90809-1222

[21] Appl. No.: 361,931

[22] Filed: Jun. 5, 1989

[51] Int. Cl.⁵ .............................................. B60T 3/00
[52] U.S. Cl. ..................................... 188/32; 244/115; 410/10; 410/30
[58] Field of Search ............................ 188/4 R, 32, 36; 410/10, 11, 23, 30; 244/115

[56] References Cited

U.S. PATENT DOCUMENTS

| | | | |
|---|---|---|---|
| 1,465,852 | 8/1923 | Lane | 188/32 |
| 1,803,942 | 5/1931 | Lunati | 188/32 |
| 2,299,115 | 10/1942 | Staley | 188/32 |
| 2,630,192 | 3/1953 | Stenhouse | 188/32 |
| 3,305,049 | 2/1967 | Willey | 188/32 |
| 3,734,241 | 5/1973 | Hale | 188/32 |
| 3,845,643 | 11/1974 | Barrett | 188/32 X |
| 4,031,726 | 6/1977 | Jager | 188/30 X |
| 4,739,863 | 4/1988 | Stauffer | 188/32 |
| 4,850,767 | 7/1989 | Andre et al. | 410/30 X |

FOREIGN PATENT DOCUMENTS

| | | | |
|---|---|---|---|
| 3231436 | 3/1983 | Fed. Rep. of Germany | 410/30 |
| 2284481 | 4/1976 | France | 410/30 |

Primary Examiner—George E. A. Halvosa

[57] ABSTRACT

A restraining device for an aircraft with wheels having tires thereon, comprised of a base plate upon which is mounted a restraint members to prevent movement of the tire when it is positioned on the base plate. The restraint members are hinged on one side of the base plate to allow for opening and closing. This movement is an arc laterally across the base plate. The restraint members in the closed position are secured to the base plate by latches mounted on the base plate located laterally across from the hinges.

4 Claims, 5 Drawing Sheets

TAXIGUARD

BACKGROUND OF THE INVENTION

1. Field of Invention

The invention relates generally to an aircraft restraint device for safety and security.

2. Description of Prior Art

There are many occasions when starting the engine of light aircraft with propellers requires turning the propeller by hand. This is an unsafe procedure. Common practice is to place small chocks forward of the aircraft tire to prevent movement. Once started, it is possible for the aircraft to jump the chocks and injur persons or property.

An object of this invention is to provide retention to aircraft void of a parking brake system.

It is an object of this device to provide a restraint means with easy ingress, egress and portability non-existent in the prior art.

Until now there has not been an adequate means of providing security for parked aircraft to prevent rolling or taxing after release of the parking brake.

BRIEF SUMMARY OF THE INVENTION

The invention provides an improved method of restraining an aircraft by preventing movement of the tire. The tire is held by a restraint means which fences the tire on three sides. The restraint is hinged along one side of the base plate to allow opening and closing in relation to the stationary base plate. With the tire positioned on the base plate, the restraint means is closed over the tire and secured to the base plate by latches mounted on the base plate and located laterally across from said hinges. The open side of the restraint means allows landing gear structure to be passed while actuating the device to either position. A securing means is provided on the base plate in a location favorable for passing a security cable between the landing gear strut and the base plate.

DESCRIPTION OF PREFERRED EMBODIMENT

Figure 1:
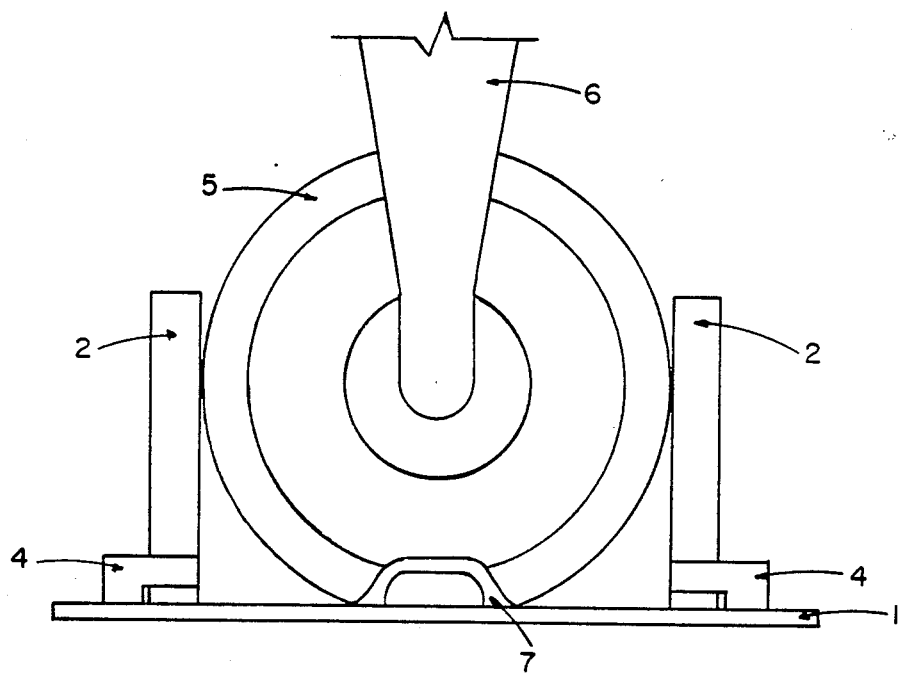
FIG. 1 is a side view of the device, showing the open side of the restraint which permits passage of the landing gear strut during actuation. Also shown are securing latches turned to the closed position along with a security device attachment point.
Figure 2:
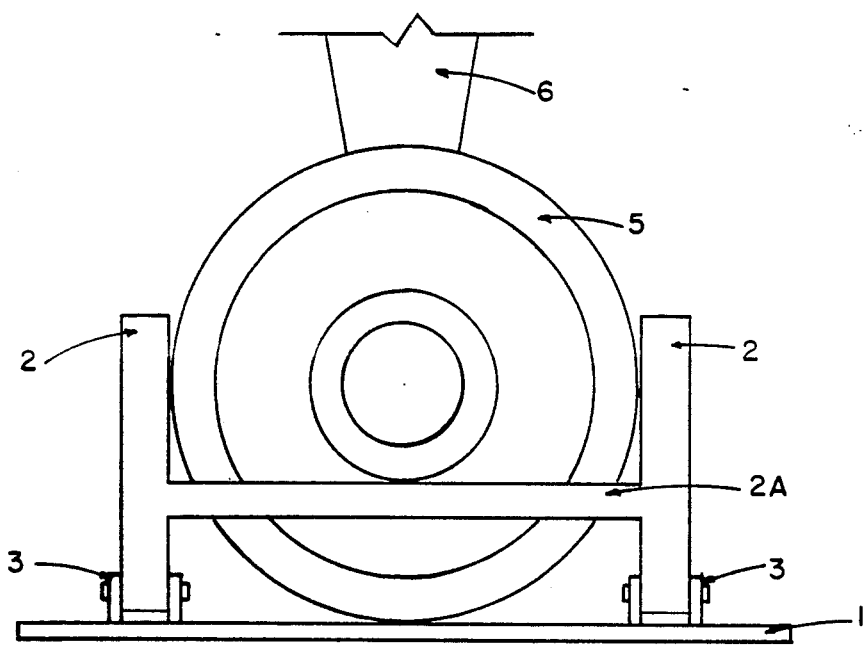
FIG. 2 is a side view of the device showing the closed side of the restraint and the hinge configuration.
Figure 3:
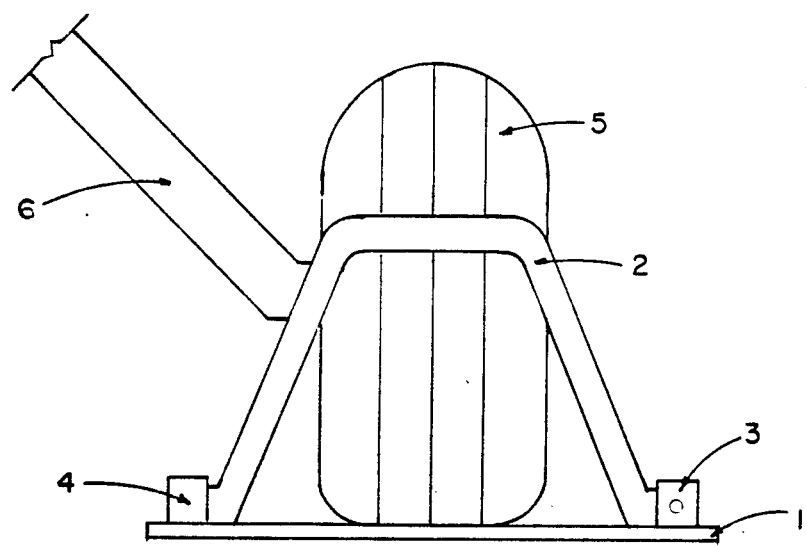
FIG. 3 is an end view with the restraint shown in a closed position and the latches in a closed position.
Figure 4:
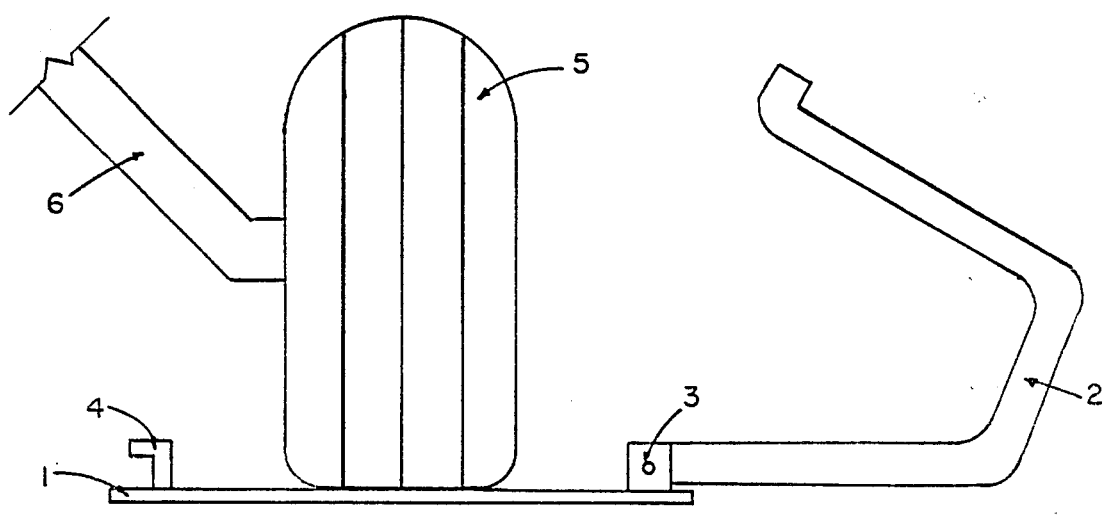
FIG. 4 is an end view showing the restraint in an open position and the latches in an open position.
Figure 5:
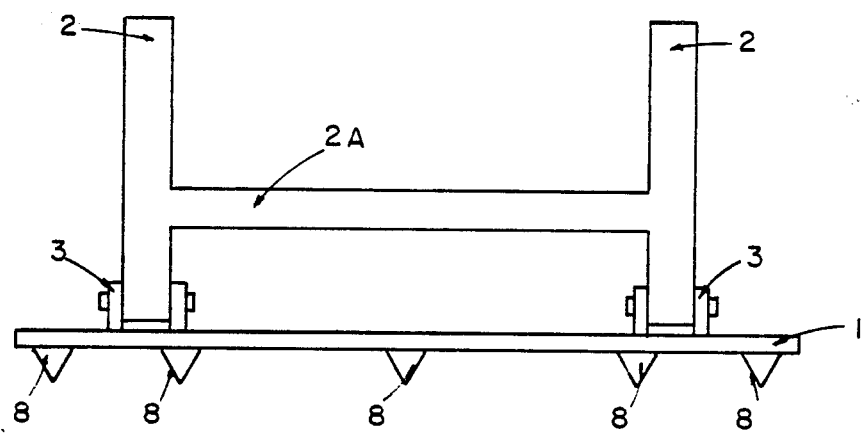
FIG. 5 is a side view of device showing horizontal movement resisters extending from the bottom surface of the base plate.

Referring to FIGS. 1-4 there is shown an aircraft tire and wheel assembly 5 including a tire resting on a base plate 1, which provides a mounting base plate, for hinges along one side portion of the base plate. Positioned laterally across from hinge 3 on another side portion of the base plate is latch 4. Arch shaped restraint elements 2 are connected to hinges 3 in such a manner as to allow movement in a direction transverse to the rolling movement of said wheel assembly in relation to the stationary base plate. Restraint elements 2 have an open side opposite the rigid connecting element 2a, FIGS. 1 and 2, to allow passage of landing gear strut 6 during actuation of restraint elements 2 to open or closed position. Latch 4 rotates on a horizontal plane through 90 degrees of rotation to cover the free ends of restraint elements 2 as shown in FIG. 1 and FIG. 3 compared with an open position of latch 4 relative to the free ends in FIG. 4. A security device attach point 7 is shown in FIG. 1 mounted to base plate located in a favorable position to allow passage of cable between base plate and landing gear strut 6 (cable not shown for clarity of drawing) thus securing the aircraft to the base plate and providing locking capabilities. FIG. 5 shows horizontal movement resisters 8 located at multiple points on the bottom surface of the base plate to assure against horizontal movement when the device is used on varying surfaces.

I claim:

1. A restraining device for an aircraft having a plurality of wheels with tires thereon which comprises: a base plate means including side and end portions, consisting of a generally flat platform for a tire to rest on, having a hinge means and a latch means attached to opposite side portions, a restraint means attached to said hinge means for preventing movement of said tire when said restraint means is in a tire engagable position, said latch means having open and closed positions and holding said restraint means in a tire engagable position when closed and allowing said restraint means to be pivoted about said hinge means when turned to an open position, said restraint means including at least two arch shaped elements jointed together by a rigid means on only the side portion of said base plate means attached to said hinge means, said elements being separately attached to said hinge means at locations diameterically spaced relative to an associated one of said wheels for movement in a direction transverse to rolling movement of said wheel on said base plate means.

2. The device as described in claim 1 wherein: said restraint means has one open side to allow passage of landing gear strut during actuation of device.

3. The device as described in claim 1 wherein: said base plate is fitted with a suitable means to attach a security device between said base plate and said landing gear strut.

4. The device as described in claim 1 wherein: said base plate at the surface that contacts the ground is fitted with horizontal movement registers.

* * * * *